United States Patent
Fong

(10) Patent No.: US 7,748,858 B2
(45) Date of Patent: Jul. 6, 2010

(54) PHOTOGRAPHIC DIFFUSER

(75) Inventor: Gary Fong, Seattle, WA (US)

(73) Assignee: Gary Fong, Inc., Seattle, WA (US)

(*) Notice: Subject to any disclaimer, the term of this patent is extended or adjusted under 35 U.S.C. 154(b) by 57 days.

(21) Appl. No.: 12/024,046

(22) Filed: Jan. 31, 2008

(65) Prior Publication Data

US 2009/0154135 A1   Jun. 18, 2009

Related U.S. Application Data

(60) Provisional application No. 61/014,392, filed on Dec. 17, 2007.

(51) Int. Cl.
  *G03B 15/02* (2006.01)
  *G03B 15/00* (2006.01)

(52) U.S. Cl. ................. 362/3; 362/8; 396/198

(58) Field of Classification Search ......... 362/8, 362/11, 16, 3; 396/4, 61, 62, 174, 190, 197, 396/198, 200

See application file for complete search history.

(56) References Cited

U.S. PATENT DOCUMENTS

| | | | |
|---|---|---|---|
| 756,194 A | 3/1904 | Zalinski | |
| 1,769,993 A | 7/1930 | Gillinder | |
| 1,874,086 A | 8/1932 | Dickson | |
| 2,235,864 A | 3/1941 | Brennan et al. | |
| 2,747,076 A | 5/1956 | Eloranta | |
| 2,879,377 A | 3/1959 | Layng | |
| 3,191,022 A | 6/1965 | Wince | |
| 3,855,602 A | 12/1974 | Hoos | |
| 4,052,607 A | 10/1977 | Larson | |
| 4,066,885 A | 1/1978 | Weinberg | |
| 4,075,472 A | 2/1978 | Higuchi | |
| 4,078,170 A * | 3/1978 | Sloop ................. 362/322 |
| 4,084,168 A | 4/1978 | Pizzuti et al. | |
| 4,091,402 A | 5/1978 | Siegel | |
| 4,091,444 A | 5/1978 | Mori | |
| 4,109,301 A | 8/1978 | Wakimura | |
| 4,146,918 A | 3/1979 | Tureck | |
| D251,630 S | 4/1979 | Larson | |
| 4,175,279 A | 11/1979 | Asaki | |
| 4,190,880 A | 2/1980 | Esaki | |
| 4,251,854 A | 2/1981 | Kaneko et al. | |
| 4,276,579 A | 6/1981 | Yako | |
| 4,333,127 A | 6/1982 | Alkema et al. | |

(Continued)

FOREIGN PATENT DOCUMENTS

JP    10260457 A    9/1998

OTHER PUBLICATIONS

Author Unknown, Demb Flash Diffusers, Demb Flash Diffuser Pro, http://dembflashdiffusers.com/, © Joe Demb 2006, 2 pages, Belmont, Massachusetts.

(Continued)

*Primary Examiner*—John A Ward
(74) *Attorney, Agent, or Firm*—Christie, Parker & Hale, LLP

(57) ABSTRACT

A photographic light diffuser for mounting to a camera with a hot shoe and an internal flash including a light diffuser and a diffuser mount removably attachable to the light diffuser. The diffuser mount is adapted to attach to the hot shoe while permitting operation of the internal flash.

18 Claims, 7 Drawing Sheets

U.S. PATENT DOCUMENTS

| | | | |
|---|---|---|---|
| 4,443,837 A * | 4/1984 | Migliori et al. | 362/396 |
| 4,446,506 A | 5/1984 | Larson | |
| 4,479,173 A | 10/1984 | Rumpakis | |
| 4,539,624 A | 9/1985 | Stone | |
| 4,562,521 A | 12/1985 | Noguchi | |
| 4,594,645 A | 6/1986 | Terashita | |
| 4,610,525 A | 9/1986 | Yoshida et al. | |
| 4,633,374 A | 12/1986 | Waltz et al. | |
| 4,669,031 A | 5/1987 | Regester | |
| 4,710,012 A | 12/1987 | Yamada | |
| 4,757,425 A | 7/1988 | Waltz | |
| 4,807,089 A | 2/1989 | Nussli | |
| 5,095,325 A | 3/1992 | Carstens | |
| 5,154,503 A | 10/1992 | Sternsher | |
| 5,311,409 A | 5/1994 | King | |
| 5,556,186 A | 9/1996 | Pilby | |
| 5,560,707 A | 10/1996 | Neer | |
| 5,727,861 A * | 3/1998 | Motohashi | 362/16 |
| 5,839,006 A | 11/1998 | Beckerman | |
| 6,010,234 A | 1/2000 | Rahn | |
| 6,361,192 B1 | 3/2002 | Fussell et al. | |
| 6,502,962 B1 | 1/2003 | Menke et al. | |
| 6,709,121 B1 | 3/2004 | Lowe et al. | |
| 6,981,785 B1 | 1/2006 | Watchulonis | |
| D552,272 S | 10/2007 | Amphlett et al. | |
| 2002/0039490 A1 * | 4/2002 | Hagiuda et al. | 396/155 |

OTHER PUBLICATIONS

Author Unknown, Sto-Fen Products: Bounce Flash Specialists, http://web.archive.org/web/20050211002726/http://www.stofen.com/, website publication Feb. 11, 2005, last updated Jan. 28, 2005, Copyright 1999-2005, 2 pages, Sto-Fen Products, Santa Cruz, California.

Author Unknown, Stroboframe, Flash Brackets and Accessories, product pamphlet, ©1992, 16 pages, The Saunders Group, Rochester, New York.

Couch, The World Leader in Flash Accessories for Digital & Film, http://web.archive.org/web/20050210100311/http://www.lumiquest.com/, website publication Feb. 10, 2005, © 2004 LumiQuest, 2 pages, LumiQuest, New Braunfels, Texas.

Sint, Steve, Sint's View, Mirror, mirror on the wall, which is the baaaaaddest trade show of them all???, Popular Photography, Feb. 1996, 3 pages, Hachette Filipacchi Media US, Inc., New York, New York.

Internet: http://www/lumiquest.com/; LumiQuest The World Leader in Flash Accessories for Digital & Film; © 2005 LumiQuest; 1 sheet.

Product Pamphlet: Stroboframe Flash Brackets and accessories; © 1992; 16 sheets.

Magazine Article: Sint, S., "Sint's View", Popular Photography, Feb. 1996, 3 sheets.

Internet: http•//dembflashdiffusers.com/; Demb Flash Diffuser Pro; © 2006; 2 sheets.

* cited by examiner

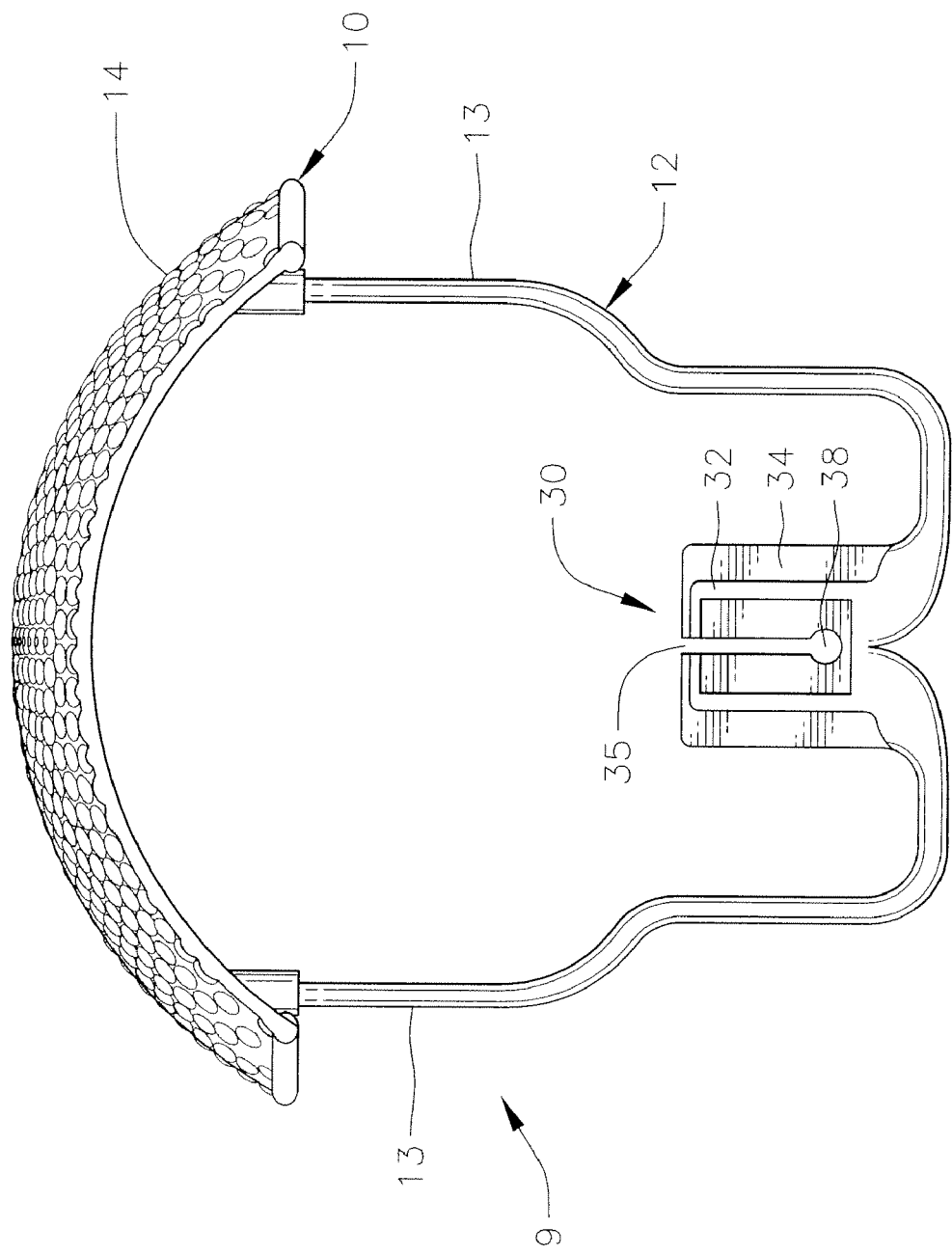

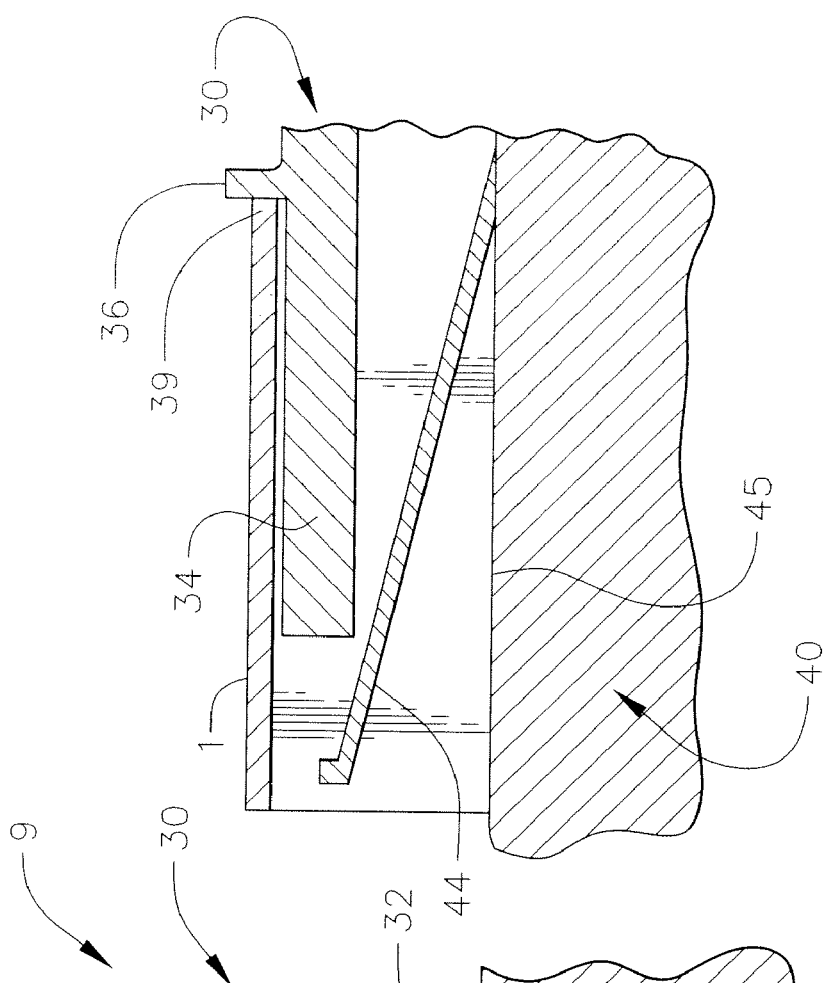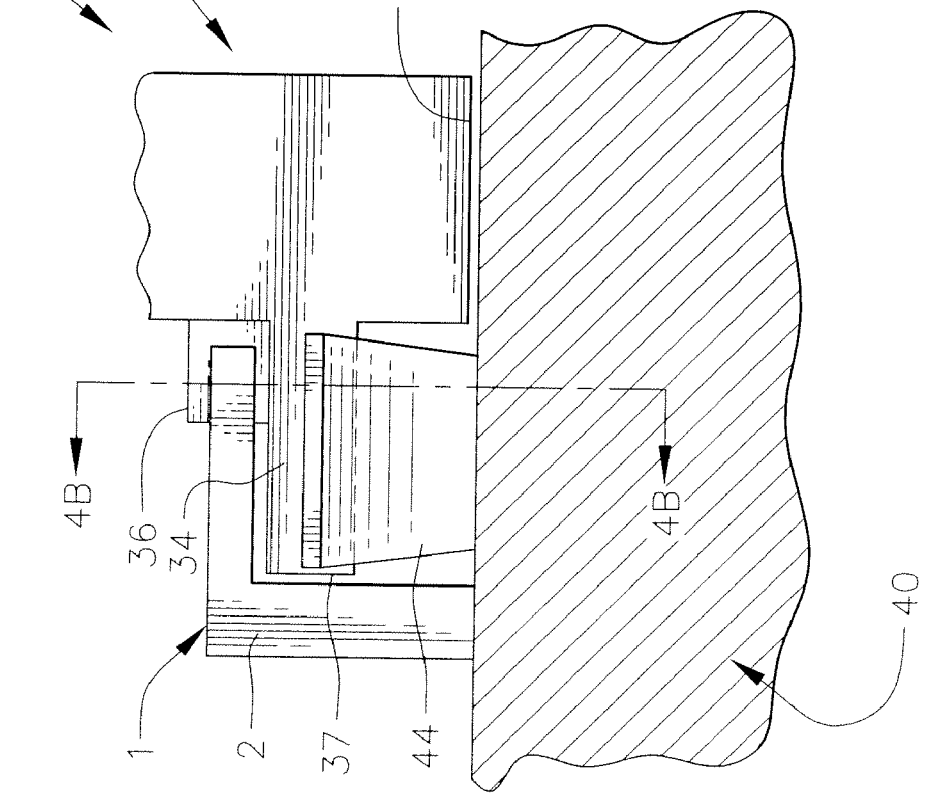

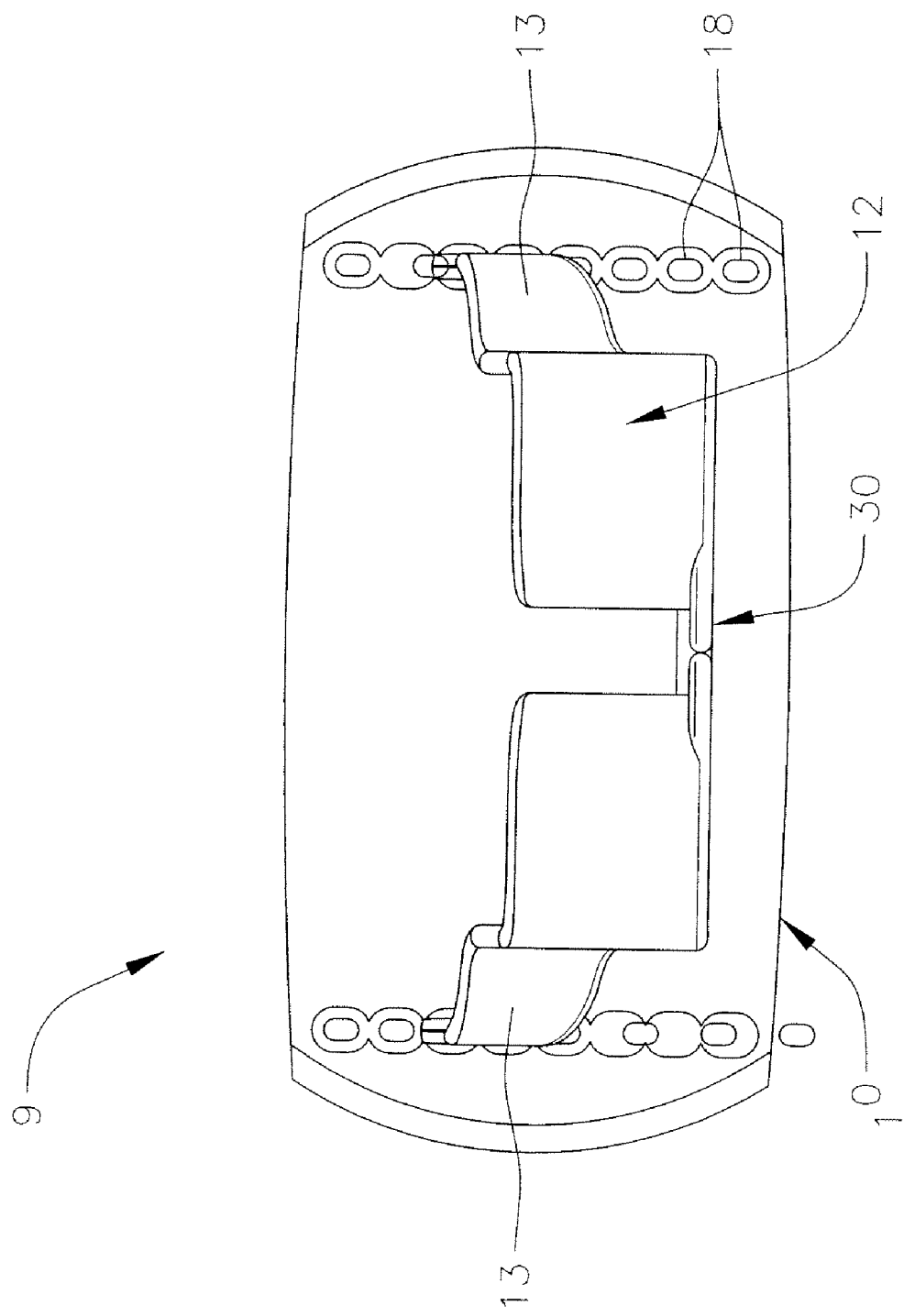

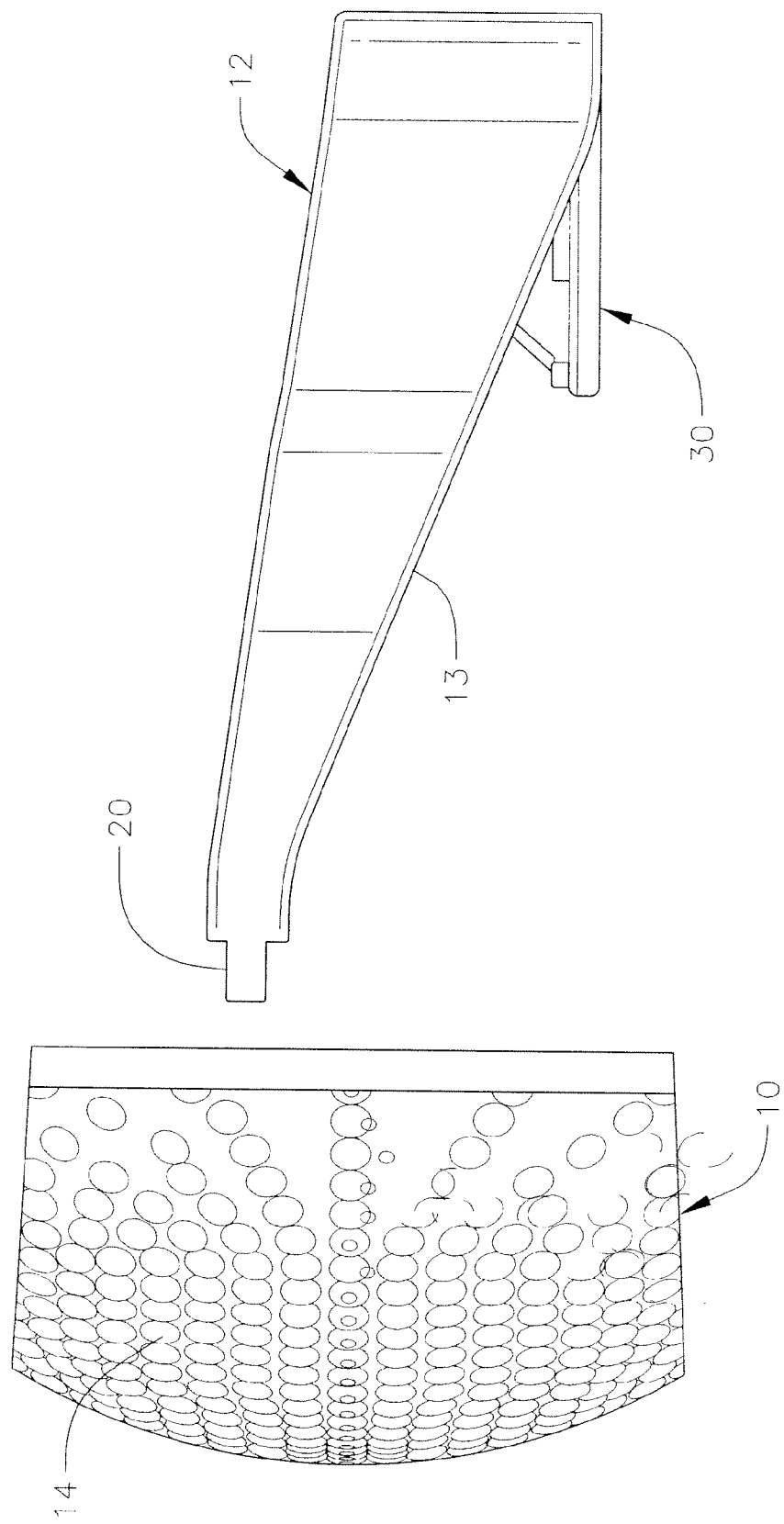

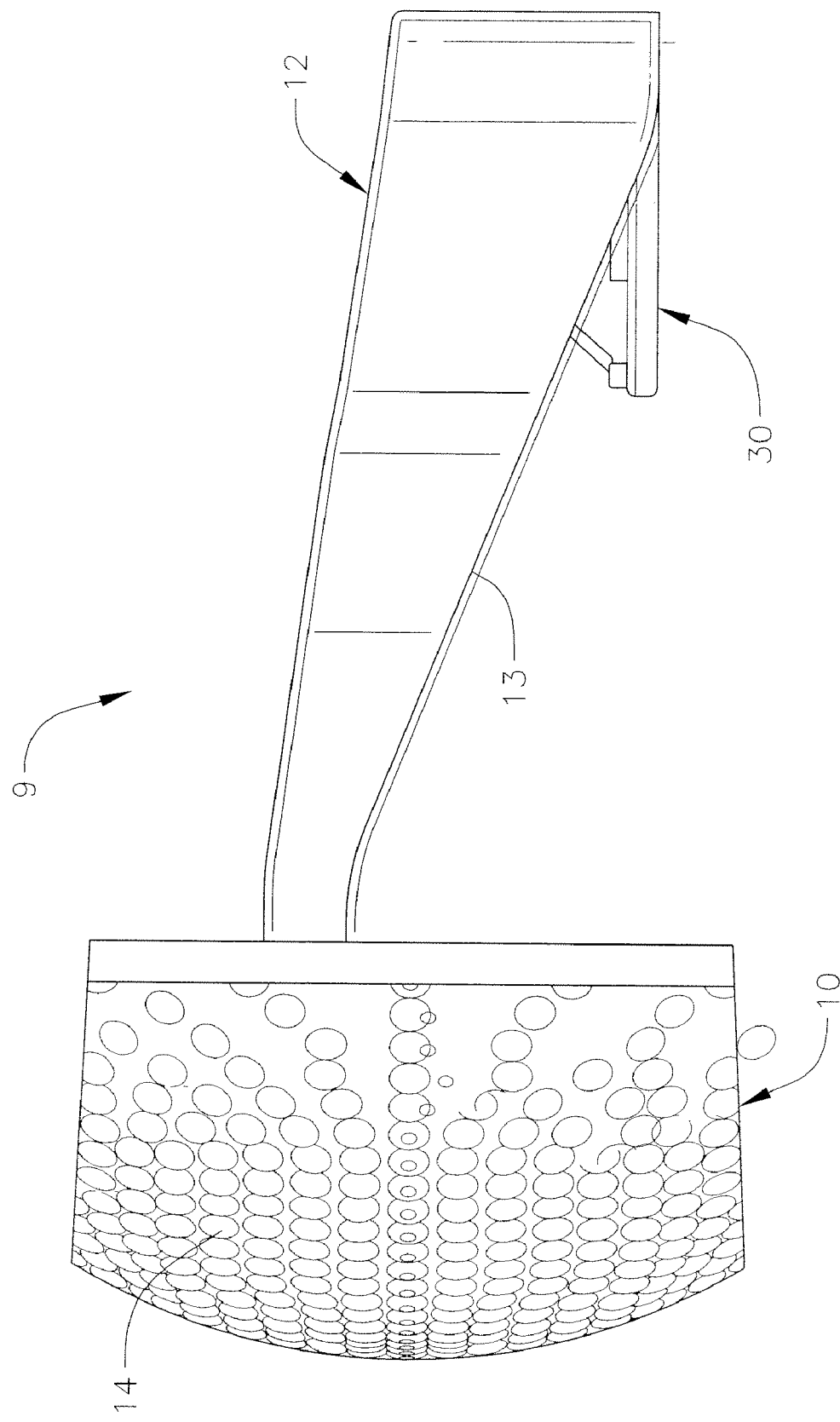

PHOTOGRAPHIC DIFFUSER

CROSS-REFERENCE TO RELATED APPLICATION

This application claims priority to and the benefit of U.S. Provisional Patent Application No. 61/014,392, filed on Dec. 17, 2007 and entitled PHOTOGRAPHIC DIFFUSER, the entire content of which is hereby expressly incorporated by reference.

FIELD OF THE INVENTION

The present invention relates to photographic light diffusers, and more particularly, to a portable light diffuser that mounts on a camera.

BACKGROUND

Some cameras may be fitted with external flashes that attach to the camera via a hot shoe. A hot shoe 1, shown in FIG. 1, is a mounting point on the top of the camera that allows an external flash with a matching adapter to be physically secured and electrically coupled to the camera so that operation of the external flash may be synchronized with operation of the camera.

Some cameras have an internal flash. The operation of the internal flash is synchronized with the operation of the camera to provide additional lighting for the subject of a photograph. However, lighting provided by the internal flash may not always produce the effect desired in the photograph. The concentrated light from the internal flash may result in harsh reflections and shadows appearing on the subject in the photograph. Therefore, a user may have a need to modify the light produced by the internal flash.

Some cameras include both a hot shoe 1 and an internal flash. For such cameras, insertion of an external flash into the hot shoe 1 may disable the internal flash from being operated, so that light can be better controlled. More specifically, the external flash is positioned using rails 2 of the hot shoe 1. When the external flash is positioned using the rails 9, one or more springs are compressed to disable the internal flash. Further, the hot shoe 1 provides an electrical connection point 6 between the camera and the external flash to synchronize the operation of the camera and the external flash.

Photographic light diffusers are commonly used to provide soft lighting effects in photographs. To achieve a diffuse lighting effect, light from a flash can be passed through a semi-transparent material, or it may be reflected off a material which may cause the light to scatter to some extent. Typically, such photographic light diffusers are provided by stationary screens, umbrellas, soft boxes, and the like. Such devices provide excellent lighting effects in fixed studio settings where there is no need to transport the lighting equipment from place to place.

However, it can be inconvenient, if not impossible, to use such lighting accessories outside of a photography studio. For photography outside of a studio, an adjustable, portable diffuser, which attaches directly to the camera, may be desirable. Such a diffuser may be placed directly over the flash to provide a semi-transparent material to diffuse the light of the flash.

However, in some situations, it may be desirable to diffuse light from the internal flash and not an external flash. Therefore, there is a need for a photographic light diffuser that may be utilized with an internal flash and is easily mountable on the camera.

SUMMARY OF THE INVENTION

An embodiment of the present invention provides a photographic light diffuser for mounting to a camera with a hot shoe and a flash, which includes a diffuser panel and a diffuser mount. The diffuser mount is adapted to attach to the hot shoe while permitting operation of the flash.

The diffuser panel may include an arc-shaped panel formed of a semi-transparent material.

The diffuser mount may include a base and at least one leg.

The diffuser panel may include diffuser mount receptacles for receiving at least one leg to attach the diffuser panel to the diffuser mount in a removeable manner by an interference fit.

The base may include at least one flange and at least one ridge. The at least one ridge may extend from beneath the at least one flange and may be located between a midline of the base and a lateral edge of the at least one flange.

The at least one flange and the at least one ridge may position the base in the hot shoe so that the base does not disable the flash.

The diffuser mount may include a pair of legs.

A slit may extend from a front of the base towards a rear of the base.

The slit may be of a keyhole shape.

Another embodiment of the present invention provides a photographic light diffuser for mounting to a camera with a hot shoe and an internal flash, the hot shoe of the type including a pair of rails and a spring operated flash disabler, which includes a diffuser panel and a diffuser mount adapted to attach to the hot shoe while permitting operation of the pop-up internal flash. The diffuser mount includes at least one leg and a base.

The base may be adapted to mate with the rails of the hot shoe without engaging the flash disabler and may include at least one flange adapted to fit between the rails of the hot shoe and at least one ridge, wherein the ridge extends from beneath the flange and is located between a midline of the base and a lateral edge of the flange.

Another embodiment of the present invention provides a photographic light diffuser for mounting to a camera with a hot shoe and an internal flash, the hot shoe of the type including a pair of rails and a spring operated flash disabler, including a diffuser panel, wherein the diffuser panel includes an arc-shaped panel formed of a semi-transparent material, and a diffuser mount adapted to attach to the hot shoe while permitting operation of the pop-up internal flash. The diffuser mount includes a pair of legs and a base adapted to mate with the rails of the hot shoe without engaging the flash disabler. The base includes at least one flange adapted to fit between the rails of the hot shoe and at least one ridge, wherein the ridge extends from beneath the flange and is located between a midline of the base and a lateral edge of the flange.

BRIEF DESCRIPTION OF THE DRAWINGS

FIG. 3 is a bottom plan view of the photographic light diffuser of FIG. 2.

FIG. 4A is a schematic front view of the photographic light diffuser of FIG. 3 mounted on a hot shoe.

FIG. 4B is a schematic view of a cross-section through line 4B of the photographic light diffuser mounted on a hot shoe of FIG. 4A.

FIG. 5 is a rear view of the photographic light diffuser of FIG. 2.

FIG. 6 is a side plan view of a disassembled photographic light diffuser of FIG. 2.

FIG. 7 is a side view of the photographic light diffuser of FIG. 2.

DETAILED DESCRIPTION

Figure 1:
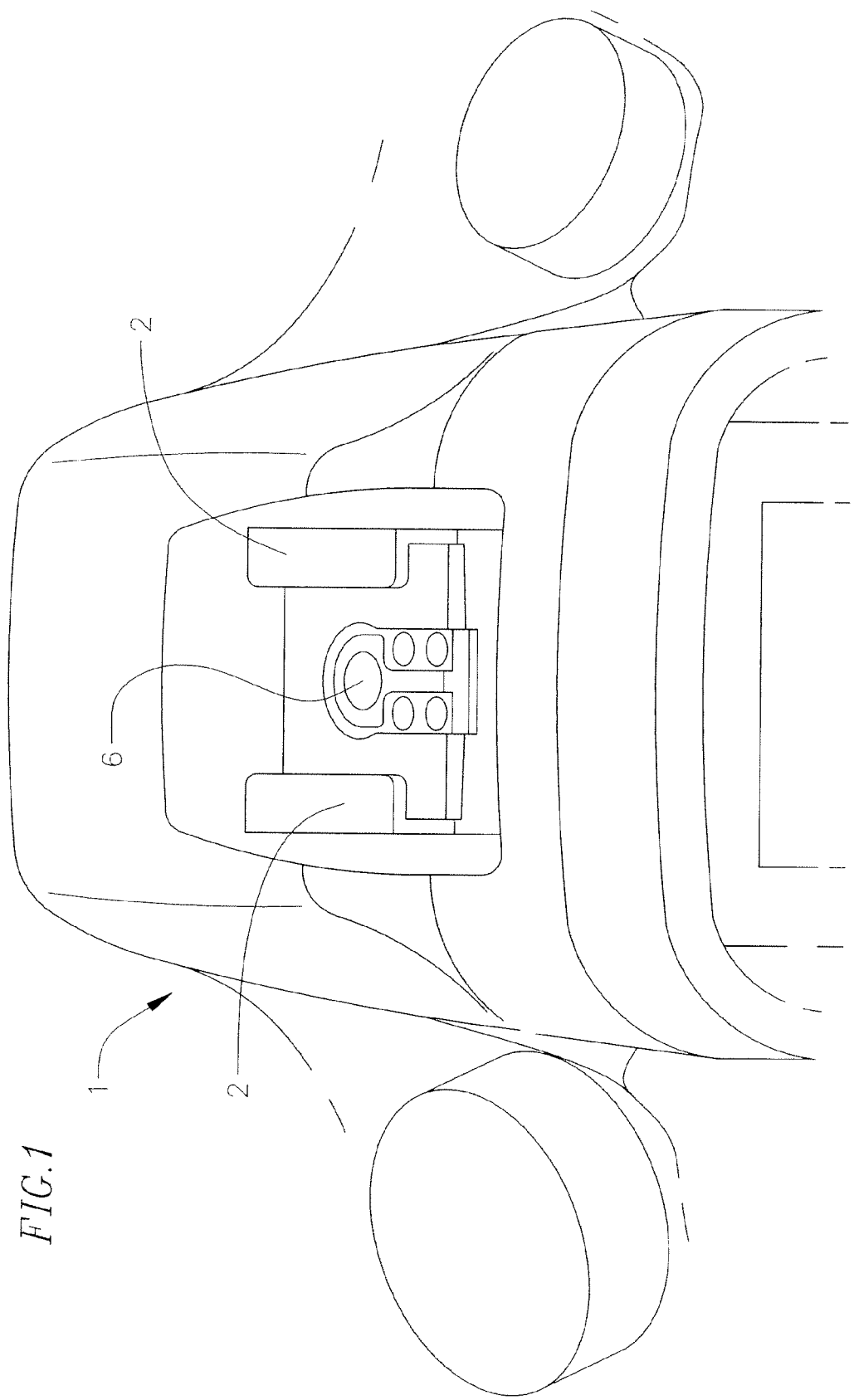
FIG. 1 is a perspective view of an exemplary hot shoe located on a camera.
Figure 2:
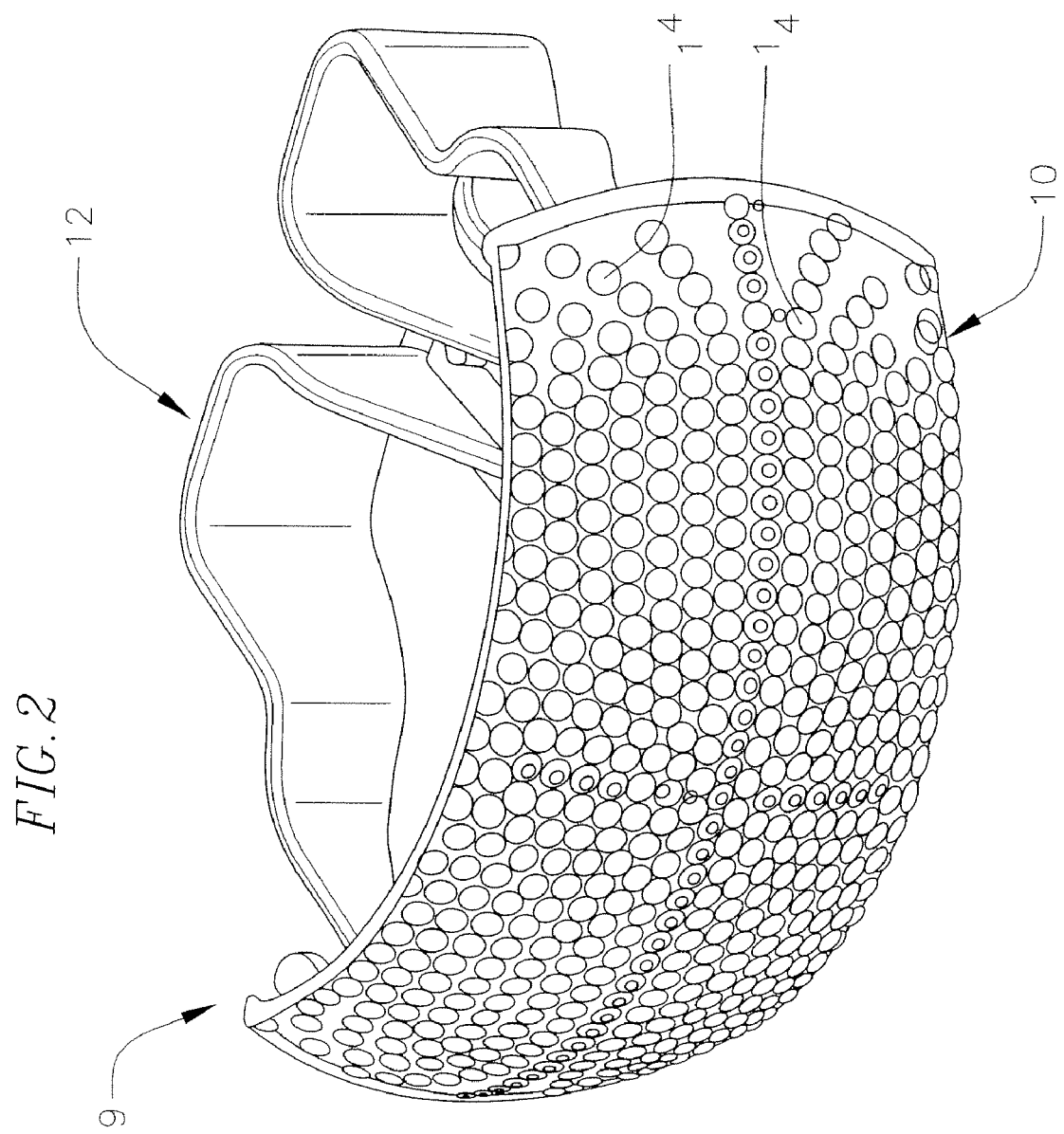
FIG. 2 is a perspective view of an exemplary embodiment of a photographic light diffuser of the present invention.

As shown in FIGS. 2 and 3, an exemplary embodiment of the present invention provides a photographic light diffuser 9 for use with cameras having an internal flash and a hot shoe 1. The photographic light diffuser 9 includes a diffuser panel 10 and a diffuser mount 12, which includes a base 30 and legs 13.

According to this embodiment, the diffuser mount 12 is formed of a suitable synthetic polymeric material that has some flexibility, such as plastic. Further, the diffuser mount 12 positions the diffuser panel 10 on a camera in a desired position between the subject of a photograph and the internal flash of the camera, for this embodiment, in front of the internal flash. More specifically, the base 30 of the diffuser mount 12 is adapted to be inserted into the hot shoe 1 without disabling the internal flash.

The base 30 has laterally extending flanges 34. Ridges 32 protrude beneath each flange 34, extending from the front of the base 30 towards the rear of the base in a region between a midline of the base and a lateral edge of the flanges 34. In one exemplary embodiment, the ridges 32 are generally symmetric. The ridges 32 may also protrude from each flange 34 across a front portion of the base 30. A slit 35 may extend from the front of the base 30 towards the rear 38 of the base and may be keyhole-shaped.

As shown in FIG. 4A, to mount the photographic light diffuser 9 to a camera 40, the base 30 is inserted into the hot shoe 1. More specifically, the base 30 is slid into the hot shoe 1 such that a peripheral surface 37 of the flange 34 substantially abuts an interior of the rail 2. The slit 35 allows the flanges 34 to be medially compressed during insertion and allows the flanges to press against the camera 40 to provide an interference fit between the flanges and the rails 2 of the hot shoe 1. The optimal keyhole-shaped slit 35 provides additional flexibility to the base 30 to help hold it in place between the rails 2 of the hot shoe 1, while still permitting easy removal. As such, the photographic light diffuser 9 can be firmly attached to, yet easily removed from, the camera 40. The ridges 32 of the base 30 locate the flanges 34 so that the flanges do not compress springs 44 that disable the internal flash of the camera 40 when compressed. Therefore, the internal flash of the camera 40 is not disabled and will operate when the base 30 is inserted into the hot shoe 1. One of ordinary skill in the art will appreciate that various configurations of a ridge may be used without departing from the spirit and scope of the present invention.

As shown in FIG. 4B, the springs 44 generally extend upward from a bottom surface 45 of the hot shoe 1, and, when compressed to be substantially parallel to the bottom surface, disable the internal flash. At least one stop 36 locates the base 30 toward the rear of the hot shoe 1 so that the base does not compress the spring 44. Specifically, the stop 36 engages an end 39 of the hot shoe 1, which prevents further forward movement of the base 30. As will be appreciated by one of ordinary skill in the art, other types of stops may be utilized to prevent the base 30 from engaging the springs 44.

As shown in FIGS. 5-7, the diffuser mount 12 also includes legs 13 that extend from the base 30 and taper to terminate in diffuser mount adapters 20. The legs 13 are of a length and shape that will allow the diffuser panel 10 to be located in front of the internal flash. In an exemplary embodiment, the diffuser mount adapters 20 are cylindrical.

The diffuser panel 10 is composed of a suitable synthetic polymeric material that is semi-transparent, such as plastic. In one exemplary embodiment, the diffuser panel 10 may be arc-shaped with a number of bump-like protrusions 14 (or rounded protrusions or lens-like projections) on an exterior surface and a smooth interior surface. However, one of ordinary skill in the art will appreciate that the diffuser panel 10 may have a number of suitable shapes consistent with the scope of the invention.

In an exemplary embodiment of the present invention, a plurality of diffuser mount receptacles 18 are located on the interior surface of the diffuser panel 10, with the diffuser mount receptacles being adapted to receive the diffuser mount adaptors 20 of the diffuser mount 12. In one exemplary embodiment, eight substantially cylindrical diffuser mount receptacles 18 are located in a column on each side of the diffuser panel 10, as shown in FIG. 5, to allow the diffuser panel 10 to be mounted at different heights to provide different lighting effects, or to allow the photographic light diffuser to be used with different camera designs.

The diffuser panel 10 can be firmly attached to, yet easily removed from, the diffuser mount 12, as shown in FIG. 7, by inserting the diffuser mount adapters 20 into the diffuser mount receptacles 18 by an interference fit. The position of the diffuser panel 10 in relation to the camera may be adjusted by inserting the diffuser mount adapters 20 into any of the diffuser mount receptacles 18 on either side of the diffuser panel.

Light incident on the diffuser panel 10 from the internal flash is diffused (or scattered) by the semi-transparent material and bump-like protrusions 14. Light that passes through the diffuser panel 10 may illuminate the subject of the photograph more evenly than light directly from the internal flash without the diffuser panel, because the scattered light may reflect from numerous surfaces, filling in shadows and softening reflections. The effect produced by the diffuser panel 10 may be the reduction of harsh shadows and reflections that could result from the concentrated light source of the internal flash. Accordingly, use of the diffuser panel 10 in front of the internal flash will result in a photograph that may appear to have more natural lighting conditions.

The photographic light diffuser 9 is compatible with cameras having a hot shoe 1, as generally described herein. However, the photographic light diffuser 9 may also be mounted on cameras which use an electrical connection, rather than a mechanical one, to disable the internal flash.

While the present invention has been described in connection with certain exemplary embodiments, it is to be understood that the invention is not limited to the disclosed embodiments, but, rather, is intended to cover various modifications and equivalent arrangements included within the spirit and scope of the appended claims, and equivalents thereof. For example, other materials may be used to form the diffuser panel, such as rubber. Also, the diffuser panel may be formed in other shapes, such as a flat surface or a surface with multiple angles. Further, other materials may be used to form the diffuser mount, such as metal or rubber. Also, the diffuser mount may be formed in other shapes, such as having only a single leg or three or more legs.

What is claimed is:

1. A photographic light diffuser for mounting to a camera with a hot shoe and an internal flash, the photographic light diffuser comprising:

a diffuser panel; and a diffuser mount adapted to attach to the hot shoe while permitting operation of the internal flash, the diffuser mount comprising a base and at least one leg;

wherein the diffuser panel comprises diffuser mount receptacles for receiving the at least one leg to attach the diffuser panel to the diffuser mount in a removable manner by an interference fit.

2. The photographic light diffuser of claim 1, wherein the diffuser panel comprises an arc-shaped panel comprised of a semi-transparent material.

3. The photographic light diffuser of claim 1, wherein the base comprises:

at least one flange; and at least one ridge, wherein the at least one ridge extends from beneath the at least one flange and is located between a midline of the base and a lateral edge of the at least one flange.

4. The photographic light diffuser of claim 3, wherein the at least one flange and the at least one ridge position the base in the hot shoe so that the base does not disable the internal flash.

5. The photographic light diffuser of claim 1, wherein the diffuser mount comprises a pair of legs.

6. The photographic light diffuser of claim 1, wherein a slit extends from a front of the base towards a rear of the base.

7. The photographic light diffuser of claim 6, wherein the slit is of a keyhole shape.

8. A photographic light diffuser for mounting to a camera with a hot shoe and an internal flash, the hot shoe of the type including a pair of rails and a spring operated flash disabler, the photographic light diffuser comprising:

a diffuser panel, a diffuser mount adapted to attach to the hot shoe while permitting operation of the internal flash, wherein the diffuser mount comprises:

at least one leg; and a base.

9. The photographic diffuser of claim 8, wherein the diffuser panel comprises an arc-shaped panel comprised of a semi-transparent material.

10. The photographic light diffuser of claim 8, wherein the base is adapted to mate with the rails of the hot shoe without engaging the flash disabler and comprises:

at least one flange adapted to fit between the rails of the hot shoe; and at least one ridge, wherein the ridge extends from beneath the flange and is located between a midline of the base and a lateral edge of the flange.

11. The photographic light diffuser of claim 8, wherein a slit extends from a front of the base towards a rear of the base.

12. The photographic light diffuser of claim 11, wherein the slit is of a keyhole shape.

13. The photographic light diffuser of claim 8, wherein the diffuser mount further comprises a pair of legs.

14. The photographic light diffuser of claim 8, wherein the diffuser panel comprises diffuser mount receptacles for receiving at least one leg to attach the diffuser panel to the diffuser mount in a removeable manner by an interference fit.

15. A photographic light diffuser for mounting to a camera with a hot shoe and an internal flash, the hot shoe of the type including a pair of rails and a spring operated flash disabler, the photographic light diffuser comprising:

a diffuser panel, wherein the diffuser panel comprises an arc-shaped panel comprised of a semi-transparent material;

a diffuser mount adapted to attach to the hot shoe while permitting operation of the internal flash, wherein the diffuser mount comprises:

a pair of legs; and a base, adapted to mate with the rails of the hot shoe without engaging the flash disabler, the base comprising:

at least one flange adapted to fit between the rails of the hot shoe; and at least one ridge, wherein the ridge extends from beneath the flange and is located between a midline of the base and a lateral edge of the flange.

16. The photographic light diffuser of claim 15, wherein the diffuser panel further comprises diffuser mount receptacles for receiving at least one leg to attach the diffuser panel to the diffuser mount in a removeable manner by an interference fit.

17. The photographic light diffuser of claim 15, wherein a slit extends from a front of the base towards a rear of the base.

18. The photographic light diffuser of claim 15, wherein the slit is of a keyhole shape.

* * * * *